Dec. 21, 1965   D. H. SILVERN   3,224,274
GAS METER IMPROVEMENT
Filed June 20, 1963
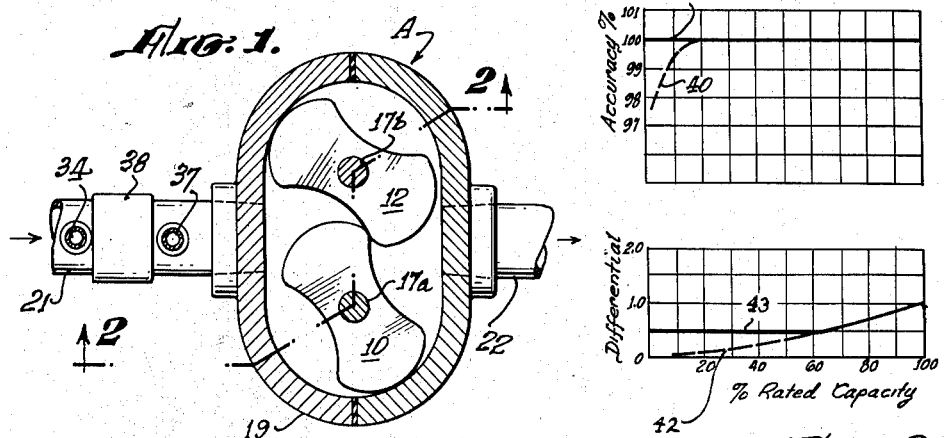
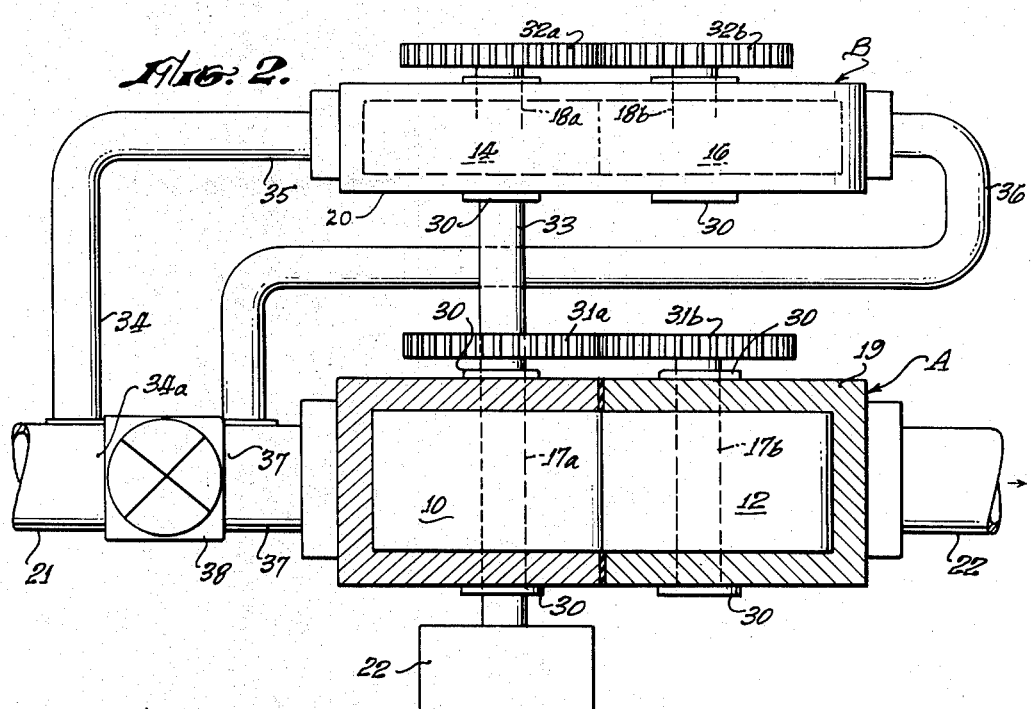
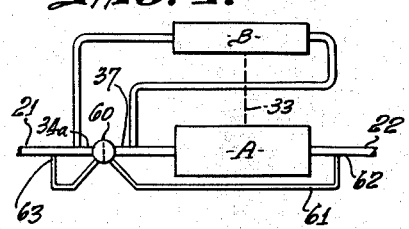
DAVID H. SILVERN,
INVENTOR.
BY HIS ATTORNEYS
Spensley & Horn.

United States Patent Office 3,224,274
Patented Dec. 21, 1965

3,224,274
GAS METER IMPROVEMENT
David H. Silvern, North Hollywood, Calif., assignor to Dresser Industries, Inc., Dallas, Tex., a corporation of Delaware
Filed June 20, 1963, Ser. No. 289,337
4 Claims. (Cl. 73—261)

This invention relates to an improved measuring device for fluids and more particularly to an improved measuring or metering device of the type utilizing measuring wheel meters.

Measuring wheel meters are well known in the art and are, in general terms, those types of fluid measuring meters which measure the volume of fluid passing through the meter by counting the number of revolutions imparted to the measuring wheel by the impinging flow of fluid on a rotatable body placed in the flow stream. Such wheel meters include meters utilizing impeller or turbine wheels, paddlewheels, screw wheels and lobe-type impellers. Although not limited thereto, the present invention has been found to be particularly useful in connection with lobed impeller meters and will be described in connection therewith as an illustrative embodiment. Such measuring wheel meters are satisfactory in the accurate measurement of relatively large volumes of fluid, but are inaccurate or inoperative at low flow rates. That is, in impeller-type meters, the meter is rotated by the volume of fluid impinging upon and passing the impellers and the meter reading is based on the rate of rotation. In a lobed impeller meter, for example, a pair of parallel pistons are rotated within a sealed casing in opposite directions. The pistons are substantially in contact whereby the surfaces carry out a rolling movement with a minimal clearance therebetween. Fluid enters the housing and in order to pass through the interior volume of the housing must rotate the rotors. The volume of fluid passing through the housing in a given period of time causes the rotors to revolve a given number of revolutions, which revolutions can be counted and read as a function of the volume.

At small rates of flow, however, the frictional resistance of the meter and the leakage of fluid past the impellers makes such meters inaccurate. That is, a certain force of fluid is required to rotate the rotors. At a minimum flow rate, it is possible for all of the fluid to flow past the rotor clearances without generating enough force to overcome the inherent friction of the rotors. The frictional resistance of the rotors resisting rotation is substantially constant, but at low flow rates, it is a very substantial and meaningful quantity as discussed more fully hereinafter.

Accordingly, it is an object of the present invention to provide a measuring device for the flow of fluids to an increased standard of accuracy.

It is another object of the present invention to provide an improved metering device for accurately measuring the flow of fluids at low rates of flow.

It is another object of the present invention to provide an improved metering device which presents little or no resistance to the flow of low pressure fluids therethrough.

Yet another object of the present invention is to provide an improved metering device for measuring the flow of fluids to a degree of accuracy not heretofore possible in the prior art by such devices which is simple, efficient and economical in construction and operation.

It is another object of the present invention to provide a meter of the type described which requires no external power supply.

The present invention is a metering device of the impeller-wheel type having the meter rotors in a meter housing through which the fluid to be measured flows, the meter rotors being rotated by the flow of the fluid. To the meter rotors, there is connected a motor of the type driven by the flow of fluid. The motor is so constructed and arranged that rotation of the motor causes the meter rotors to be driven in the direction of rotation caused by flow of fluid through the meter. Means are provided for supply of fluid to the motor at a substantially predetermined pressure and the output from the motor is predetermined to exert a rotational force on the meter rotors just sufficient to overcome the flow resistance thereof.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawings:

FIGURE 1 is a partially sectional view in elevation of a presently preferred embodiment of the present invention;

FIGURE 2 is a sectional view taken along line 2—2 of FIGURE 1;

FIGURES 3a and 3b are graphs illustrating the operation of the present invention; and, FIGURE 4 is an alternative embodiment of the present invention.

Although not limited thereto, the present invention has been found to be particularly suited for use in connection with lobed impeller meters and will accordingly be described in connection with that type of measuring wheel meter although it will be apparent to those skilled in the art in view of the description contained herein that the invention is equally applicable to other types of metering devices. Similarly, although applicable to the measurement of flow of any fluid, the invention is described in connection with the measurement of gas flow as illustrative.

Referring now to the drawings, there are shown in FIGURES 1 and 2 a presently preferred embodiment of the present invention utilizing two lobed impeller devices designated the meter A and the motor B. Although not necessarily shown to scale in the drawings, the motor B is considerably smaller than the meter A and its size is determined by the pressure drop across the meter A as will be more apparent hereinafter. The motor and meter are similar in construction and of the well known type in which pistons 10 and 12 are mounted upon spaced apart shafts 17a and 17b in the meter A within a sealed housing 19. The pair of shafts within the housing are parallel and spaced apart such that the pistons are substantially in contact, whereby the surfaces thereof carry out a rolling movement relative to one another with clearance therebetween. The housing and pistons are so related that a minimum clearance is provided between the pistons and housing walls.

Flow of gas to be measured is in the direction of the arrows or from left to right in the figure. A gas inlet line 21 is connected to the inlet side of the meter and a gas outlet line 22 is provided from the outlet side of the meter A. A readout or counting means 22 is connected to the shaft 17a of the meter to count the number of revolutions, which are then calibrated to volume flow through the meter. Readout means are well known to the art and are not described in detail herein.

The energy necessary to overcome the resistances to running of the meter pistons such as bearing friction, linkage friction, the friction of the readout device and linkages thereto has heretofore been supplied directly to the pistons by the fluid being measured. The actual speed of rotation, therefore, varies from the theoretical frictionless speed of rotation at all speeds of the meter, but is proportionally greatest at low flow rates through the meter. The variation is particularly significant in the measurement of gases, since the flow energy of the gases necessary to overcome the resistances to running is large in proportion to the total amount of energy available from the gas flow.

Referring now to FIGURES 1 and 2, the motor B is similar in construction to the meter A previously described in that pistons 14 and 16 are secured to rotatably mounted shafts 18a and 18b within housing 20. In accordance with the present invention, the shaft 18a is the output shaft from the motor A and is mechanically connected to the shaft 17a of the meter. The shafts 17a, 17b and 18a, 18b are rotatably mounted by suitable bearings 30 for rotation with the pistons. Gears 31a, 31b and 32a and 32b are connected to the shafts 17a, 17b and 18a, 18b respectively such that rotation of one piston or one shaft in the meter A or motor B causes the other piston and shaft to rotate. That is, rotation of shaft 17a with piston 10 causes piston 12 to rotate through the interconnection of gears 31a and 31b, while rotation of piston 14 causes piston 16 to rotate. Since shaft 18a is connected by suitable linkage to shaft 17a, rotation of the pistons 14, 16 in the motor B will cause the shaft 17a and therefore the pistons 10 and 12 to rotate. Although many types of linkages can be employed, shaft 17a shown to be directly connected to shaft 18b by connecting shaft 33.

A motor inlet line 34 is connected between the gas inlet line 21 and the gas inlet line 35 of the motor housing 20. A motor outlet line 36 is connected back to the meter inlet line 21 at 37. Between the motor inlet at 34a and the motor outlet at 37 in inlet line 21 there is provided a pressure regulating valve 38 of the well known type which provides a constant pressure drop through the valve, which pressure drop can be predetermined. The pressure drop through the valve then maintains a constant pressure drop between points 34a and 37 or across the motor B. The required pressure differential across the pressure regulating valve 38 and the size of the motor B are interdependent, it being necessary that the pressure differential across the motor B is sufficient to rotate the motor B at that force necessary to in turn rotate the meter A. That is, the pressure differential and size of motor B is predetermined such that the motor B exerts a turning force on the meter pistons 17a and 17b sufficient to overcome the frictional forces on the meter. Thus, the meter in effect becomes a frictionless meter relative to the flow of gases therethrough and any flow through the meter causes a proportional rotation of the meter pistons. Rotation of the meter pistons can then be calibrated and by means of a read-out device indicated as 22 the flow can be accurately measured even at extremely low flow rates. Thus, referring to FIGURE 3a, line 40 represents a typical proof curve for meters of the type heretofore known to the art. It can be seen that at flow rates of less than 20% of full capacity the proof or accuracy, which is the ratio of measured flow to actual flow decreases sharply, the accuracy being approximately 99% at 10% flow rate and being completely inaccurate at flow rates of less than 5% of capacity. Curve 41 illustrates the measured accuracy of the present invention. It can be seen that line 41 is substantially constant at 100% and that no decrease in accuracy is encountered at low flow rates. It has been found that the present invention is accurate to 1% at 1% of capacity flow. Referring to FIGURE 3b, the pressure drop across the complete meter is compared. That is, in meters of the prior art the pressure drop is shown at line 42 while in the present invention the pressure drop is shown by line 43 the difference at all rates of flow being the increase caused by the pressure differential used to rotate the motor B.

In instances where it is essential or desirable to limit the pressure drop across the entire meter an alternative embodiment as shown schematically in FIGURE 4 can be utilized, i.e., after flow through the meter in accordance with the present invention reaches a percent of full flow at which the friction forces of the meter are proportionally negligible it is no longer necessary to employ the forces of the motor B to overcome the friction losses through the meter A. It is therefore sometimes advantageous to utilize a pressure regulating valve 60 as shown in FIGURE 4 which imposes a pressure drop across the points 34a and 37 but which is of the type where the pressure drop can be varied. A fluid pressure line 61 is then connected from a point 62 on the meter outlet line 22 to the valve and from a point 63 on the meter inlet line to the opposite side of such valve 60. The valve is of the type which imposes a pressure drop in the line which pressure drop is equivalent to the difference in pressure between the points 63 and 62 or thus across the meter. For example, if a ½ inch of water pressure drop in the valve is predetermined the pressure drop in the line at point 38 will be ½ inch when the pressure drop between points 62 and 63 is ½ inch. As the flow through the meter increases the pressure drop between the point 37 and the point 63 increases and approaches ½ inch of water. The pressure drop through the valve 60 decreases correspondingly and thus the pressure differential across the motor decreases. The sum of the pressure differential across the meter A and the motor B is equal to ½ inch and thus the pressure drop across the completed meter assembly is constant at ½ inch. When the pressure drop across the meter assembly exceeds ½ inch there is no longer a pressure drop across the motor B and it exerts no net torque to the meter. Thus referring to FIGURE 3b line 42 indicates the pressure differential across a lobed impeller meter of the type heretofore known to the art, while line 43 indicates the pressure differential across the meter assembly in accordance with the present invention. It can be seen that at flow rates less than 60% in the illustrative graph the pressure differential is constant at ½ inch and when the motor ceases to function the pressure drop is solely across the meter A and is similar to that encountered in the meters of the prior art. The proof or accuracy curve of this alternative embodiment is substantially the same as described previously and shown in FIGURE 3a.

Although the present invention is illustrated and described as being composed of a meter portion A and a separate motor portion B, it can be seen that in application the two portions could be enclosed in a single housing, and the piping and conduits would be more conveniently arranged by containing the two portions in a single housing. The duplication of gears such as 31a and b and 31a and b would then be avoided, the essential feature being that the pistons of section B would be isolated from those of section A and the operation would be as previously described.

Thus, the present invention provides an improved metering apparatus for measuring the volume flow of fluid, particularly gases, which is extremely accurate at low rates of flow where accuracy has not heretofore been obtainable. The degree of accuracy is such that the present invention can be utilized not only for commercial metering applications but as a precision instrument for laboratory and similar uses where flow rate measurements are critical. The present invention provides such accuracy without the necessity of any external power source. Thus, although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

1. A metering device of the impeller wheel type comprising:
    a meter having at least one rotor adapted to be rotated by the flow of fluid through said meter;
    a motor having at least one rotor adapted to be rotated by the flow of fluid through said motor;
    said meter and motor being interconnected such that said meter rotor is rotated by said motor rotor;
    means for conducting fluid flowing through said meter through said motor;
    and means operatively connected to said fluid conducting means for predetermining the pressure of said fluid through said motor such that the output of said motor is substantially constant and substantially equal to the frictional resistance of said meter to the flow of fluid.

2. A metering device of the impeller wheel type comprising:
    a meter having at least one rotor adapted to be rotated by the flow of fluid through said meter;
    a motor having at least one rotor adapted to be rotated by the flow of fluid through said motor;
    said meter and motor being interconnected such that said meter rotor is rotated by said motor rotor;
    means for conducting fluid flowing through said meter through said motor;
    and pressure regulating means for maintaining a substantially constant pressure across said motor such that the output of said motor is substantially equal to the frictional resistance of said meter to the flow of fluid.

3. A metering device of the impeller wheel type comprising:
    a meter having at least one rotor adapted to be rotated by the flow of fluid through said meter from the meter inlet to the meter outlet;
    a motor having at least one rotor adapted to be rotated by the flow of fluid through said motor;
    said meter and motor being interconnected such that said meter rotor is rotated by said motor rotor;
    a fluid inlet line from the meter inlet to the motor inlet;
    a fluid outlet line from the motor outlet to the meter inlet; and
    means for regulating the pressure of fluid flowing through said motor at a predetermined value such that the output from said motor is substantially a constant torque force equal to the frictional resistance of said meter to the flow of fluid.

4. A metering device of the impeller wheel type comprising:
    a meter having at least one rotor adapted to be rotated by the flow of fluid through said meter from the meter inlet to the meter outlet;
    a motor having at least one rotor adapted to be rotated by the flow of fluid through said motor;
    said meter and motor being interconnected such that said meter rotor is rotated by said motor rotor;
    a fluid inlet line from the meter inlet to the motor inlet;
    a fluid outlet line from the motor outlet to the meter inlet; and
    a pressure regulating valve for regulating the pressure of fluid flowing through said motor to maintain the pressure drop across said motor substantially constant at a predetermined value such that the output from said motor is substantially a constant torque force equal to the frictional resistance of said meter to the flow of fluid.

References Cited by the Examiner

UNITED STATES PATENTS

| | | | |
|---|---|---|---|
| 1,837,333 | 12/1931 | Owens | 73—261 |
| 1,920,294 | 8/1933 | Dougherty | 73—261 |
| 1,952,882 | 3/1934 | Morgan | 73—232 X |
| 2,042,725 | 6/1936 | Montelius | 73—261 |
| 2,403,867 | 7/1946 | Lipfert | 73—232 |
| 2,621,516 | 12/1952 | Zavoico | 73—232 |

OTHER REFERENCES

Hecking: German application P121301X, April 5, 1956.

RICHARD C. QUEISSER, *Primary Examiner.*

DAVID SCHONBERG, *Examiner.*